(12) United States Patent
Chen et al.

(10) Patent No.: US 8,762,757 B2
(45) Date of Patent: Jun. 24, 2014

(54) POWER MANAGEMENT METHOD AND DEVICE THEREOF

(75) Inventors: Yung-Feng Chen, New Taipei (TW); Lung-Xsian Chen, New Taipei (TW)

(73) Assignee: Wistron Corporation, Hsichih, New Taipei (TW)

( * ) Notice: Subject to any disclaimer, the term of this patent is extended or adjusted under 35 U.S.C. 154(b) by 380 days.

(21) Appl. No.: 13/251,293

(22) Filed: Oct. 3, 2011

(65) Prior Publication Data

US 2012/0297224 A1 Nov. 22, 2012

(30) Foreign Application Priority Data

May 17, 2011 (TW) .............................. 100117198 A

(51) Int. Cl.
*G06F 1/00* (2006.01)
*G06F 13/24* (2006.01)
*G06F 3/038* (2013.01)

(52) U.S. Cl.
USPC ............................ 713/322; 710/260; 345/207

(58) Field of Classification Search
USPC .............................. 710/260; 345/207; 713/322
See application file for complete search history.

(56) References Cited

U.S. PATENT DOCUMENTS

| 6,081,664 | A * | 6/2000 | Nowlin, Jr. .................... 717/127 |
| 6,530,001 | B1 * | 3/2003 | Lee ................................. 711/154 |
| 6,731,274 | B2 * | 5/2004 | Powell ............................ 345/204 |
| 6,799,279 | B1 * | 9/2004 | Okamoto et al. ............... 713/324 |
| 6,892,146 | B2 | 5/2005 | Tung |
| 7,340,638 | B2 * | 3/2008 | Nicholson et al. ........... 714/6.11 |
| 7,363,523 | B2 | 4/2008 | Kurts |
| 7,516,260 | B2 * | 4/2009 | Yu et al. ......................... 710/260 |
| 8,150,561 | B2 * | 4/2012 | Shimotono et al. ........... 700/300 |
| 8,171,319 | B2 * | 5/2012 | Ghiasi et al. ................... 713/321 |
| 8,407,459 | B2 * | 3/2013 | Okano .............................. 713/2 |
| 2006/0236144 | A1 * | 10/2006 | Chao .............................. 713/323 |
| 2006/0238531 | A1 * | 10/2006 | Wang .............................. 345/211 |
| 2011/0134091 | A1 * | 6/2011 | Chen et al. ..................... 345/207 |

FOREIGN PATENT DOCUMENTS

| TW | 200407700 | 5/2004 |
| TW | 200625070 | 7/2006 |
| TW | 200917006 | 4/2009 |

OTHER PUBLICATIONS

Office action mailed on Dec. 4, 2013 for the Taiwan application No. 100117198, filing date: May 17, 2011, p. 1 line 14, p. 2-3, p. 4 line 5-26, p. 5, p. 6 line 1-20 and search report.

* cited by examiner

*Primary Examiner* — Paul R Myers
*Assistant Examiner* — Christopher a Daley
(74) *Attorney, Agent, or Firm* — Winston Hsu; Scott Margo

(57) ABSTRACT

A power management method for a mobile device including a basic input output system (BIOS) and an embedded controller (EC) includes determining whether the mobile device is operated in a direct current (DC) mode, determining whether a loading of an operating system of the mobile device exceeds a predetermined value, adding a flag associated with the embedded controller in a physical memory of the mobile device when the mobile device is operated in the DC mode and the loading of the operating system exceeds the predetermined value, and reading the flag in the physical memory via the basic input output system, to notify the embedded controller to perform a power management process corresponding to the flag.

19 Claims, 3 Drawing Sheets

POWER MANAGEMENT METHOD AND DEVICE THEREOF

BACKGROUND OF THE INVENTION

1. Field of the Invention

The present invention relates to a power management method and device thereof, and more particularly, to a power management method and device thereof for improving power consumption.

2. Description of the Prior Art

Capacity and life time of a laptop battery has been greatly improved in the past few years. However, the power consumption of the processor increases and there are more and more computer equipments with high power consumption installed into new generation laptops, and thus that is the reason why power management becomes important. A good usage of smart power management can greatly improve life time of the battery without buying another battery.

Most hardware of the laptop can operate in different states according to different power supplies, such as stop, sleep, idle and working. In general, display, processor and hard disk consume most of the power on a main board. Though the basic input output system (BIOS) can directly perform power management without the operating system, it is more effective to achieve power arrangement via adding smart power management into the operating system to adjust power arrangement according to different situations, e.g. operating modes of drivers, the operating system and application programs, etc.

Therefore, the advanced configuration and power interface (ACPI) is developed for providing power state of the hardware managed by the operating system, so as to achieve power saving. The ACPI standard includes different power states S0-S5, which are defined as follows:

| ACPI state | Power state | Description |
| --- | --- | --- |
| S0 | Working | The system and the hardware are completely on. |
| S1 | Standby | The CPU is off, other hardware is on. |
| S2 | Partial standby | Some hardware is turned off. |
| S3 | Stop | Only random access memory (RAM) and north bridge are on. |
| S4 | Hibernation | The system saves the contents of the RAM in the hard disk and the hardware is completely off. |
| S5 | Soft off | The system appears to be off with very low power. |

In other words, after the laptop entered the operating system, the ACPI standard and the BIOS supporting the ACPI can be utilized for performing power management. In addition, the ACPI can control the central processing unit (CPU) for power saving control to lower power consumption and operating temperature of the CPU. In general, the CPU supports power saving states C0-C3, from minimum to maximum power supply, respectively. The state C0 of the CPU indicates every portion and function of the CPU working with power supply, and the states C1-C3 indicate gradually turning off the power supply of each portion and function of the CPU. The CPU appears to be off in C3 state, only some clock signals or logic circuits provided from outer circuits have power supply. The power saving states of the CPU are not limited, for example, there is CPU supporting the power saving state C4 or thereafter, and the state number increases as the power saving level increases, but resuming time from power saving state to working state increases relatively.

However, there are still disadvantages within the operating system utilizing the ACPI for power management. For example, the operating system merely controls the hardware to enter different power states by the ACPI, e.g. the power saving state C0-C3 of the CPU, to achieve power saving, for extending life time of the laptop battery, but this power management lacks of flexibility. In short, the ACPI does not provide other mechanism to lower power consumptions of hardware, such as the CPU and display with great power consumptions, resulting in limitations of power saving performance. There is application software for providing relative mechanism to decrease power consumption of hardware, e.g. downgrade the operating frequency of the CPU when the laptop is turned from AC mode to DC mode, but this method causes serious degradation of the laptop performance.

SUMMARY OF THE INVENTION

It is therefore an objective of the present invention to provide a power management method and device thereof for decreasing power consumption.

The present invention discloses a power management method for a mobile device including a basic input output system (BIOS) and an embedded controller (EC). The method includes determining whether the mobile device operates in a direct current (DC) mode, determining whether a loading of an operating system of the mobile device exceeds a predetermined value, adding a flag associated with the embedded controller in a physical memory of the mobile device when the mobile device is operated in the DC mode and the loading of the operating system exceeds the predetermined value, and reading the flag in the physical memory via the basic input output system, to notify the embedded controller to perform a power management process corresponding to the flag.

The present invention further discloses a mobile device with a function of power management, including an embedded controller for detecting whether the mobile device operates in a DC mode, an operating system for detecting whether a loading of the operating system exceeds a predetermined value and comprises a driver for adding a flag associated with the embedded controller in a physical memory of the mobile device when the mobile device operates in the DC mode and the loading of the operating system exceeds the predetermined value, and a basic input output system (BIOS) for reading the flag in the physical memory via the basic input output system, to notify the embedded controller to perform a power management process corresponding to the flag.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
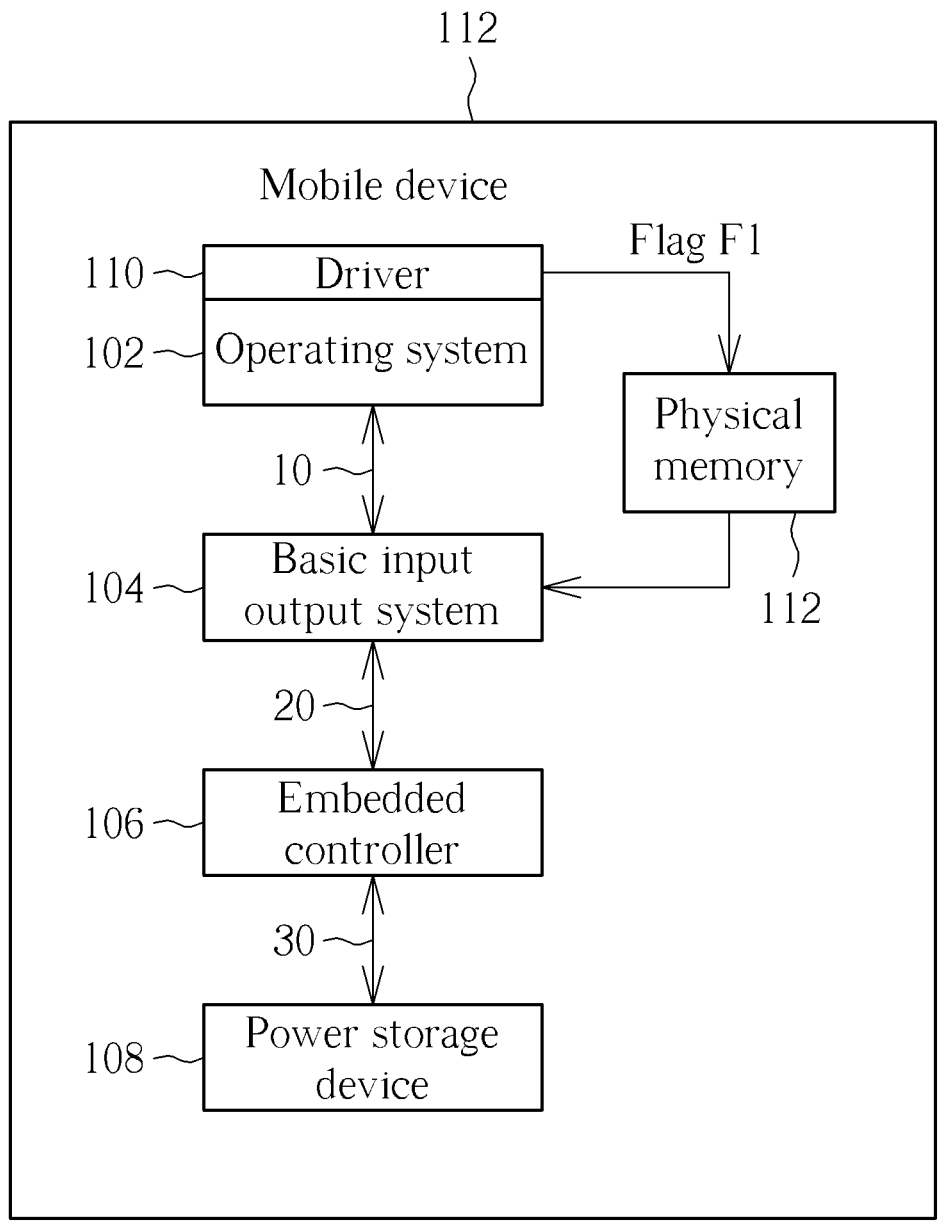
FIG. 1 is a block diagram of a mobile device according to an embodiment of the present invention.

Please refer to FIG. 1, which is a block diagram of a mobile device 100 according to an embodiment of the present invention. The mobile device 100 can be a laptop, a mobile phone, a personal digital assistant (PDA) or a touch panel, and not limit to this. The mobile device 100 includes an operating system 102, a basic input output system (BIOS) 104, an embedded controller (EC) 106, a power storage device 108 and a physical memory 112. The operating system 102 includes a driver 110, and communicates with the BIOS 104 through a first interface 10. The driver 110 is used for controlling a power management of the mobile device 100. The BIOS 104 communicates with the embedded controller 106 through a second interface 20. The embedded controller 106 communicates with the power storage device 108 through a third interface 30. The power storage device 108 can be a battery for providing power to the mobile device 100.

The first interface 10 can be an advanced configuration and power interface (ACPI), a windows management instrumentation (WMI) or a memory-mapped I/O (MMIO). The second interface 20 can be a system management interrupt (SMI). The third interface 30 can be a system management bus (SMBus). Therefore, when the operating system 102 tends to read capacity information of the power storage device 108, the operating system 102 requests the BIOS 104 to provide the capacity information through an ACPI Source Language code (ASL code) associated with the ACPI. And then, the BIOS 104 requests the embedded controller 106 to provide the capacity information through the SMI interface. The embedded controller 106 is an extension of the conventional keyboard controller (KBC) capable of reading the capacity information of the power storage device 108 through the SMBus interface, and knowing whether the mobile device 100 is connected to a power source, i.e. the power is not provided from the power storage device 108, through wiring or pin-to-pin connection, and thus the embedded controller 106 accordingly reports the capacity information to the operating system 102. In other words, the embedded controller 106 is used for detecting a power state, i.e. DC mode or AC mode, of the mobile device 100. In addition, when the mobile device 100 is in DC mode, the embedded controller 106 reads the capacity information of the power storage device 108 periodically, and stores the capacity information into the a random-access memory (RAM) of the embedded controller 106, to increase a speed of the operating system 102 reading the capacity information. On the other hand, after the operating system 102 has read the power information, the operating system 102 computes a power consumption of the power storage device 108 according to the power information, so as to provide the power information such as the power state and a power capacity of the mobile device 100 to the user.

Figure 2:
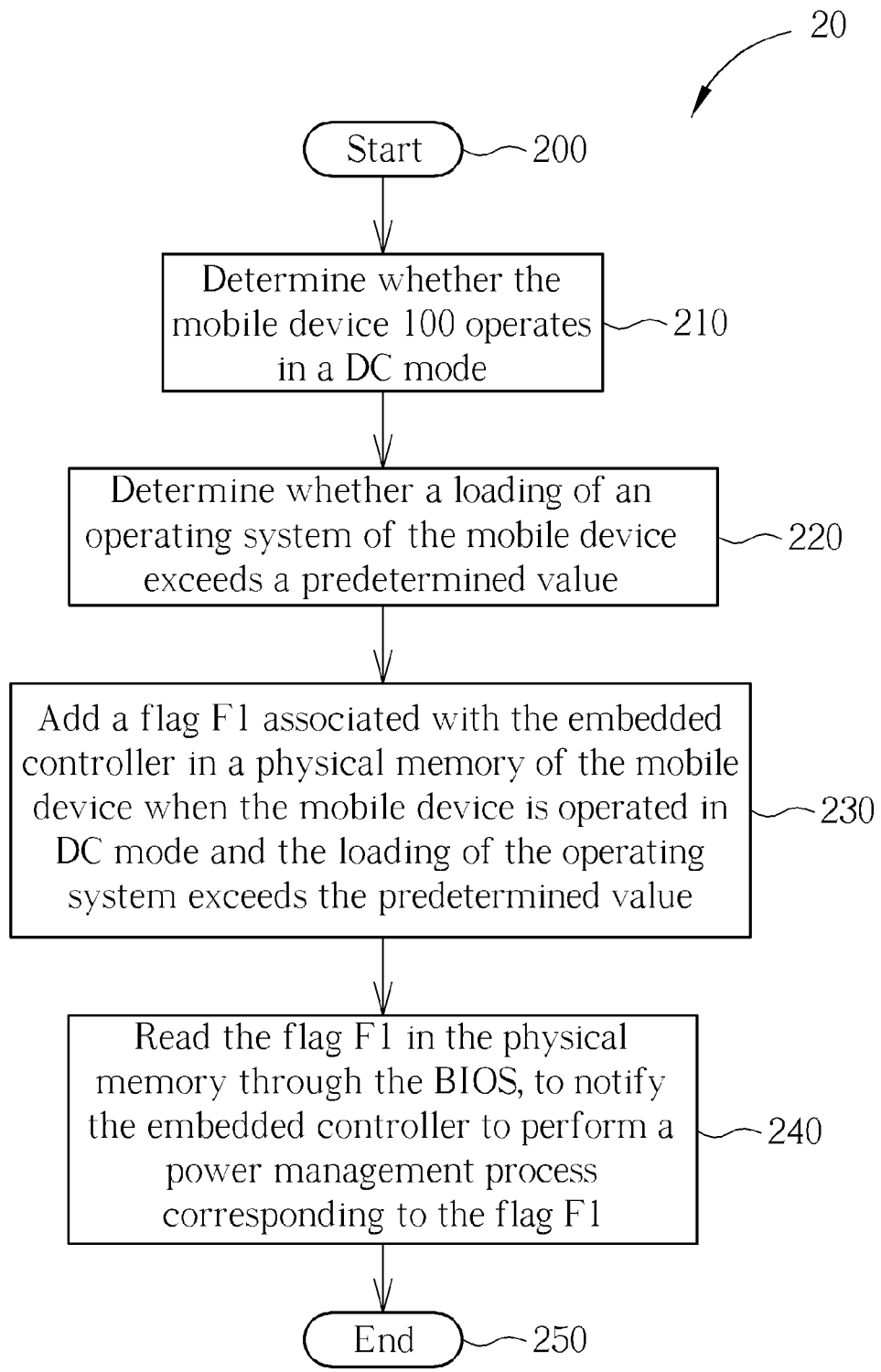
FIG. 2 is a schematic diagram of a power management process according to an embodiment of the present invention.

Please refer to FIG. 2, which is a schematic diagram of a power management process 20 according to an embodiment of the present invention. The power management process 20 is used for the mobile device 100, e.g. a laptop, a multi media player, a liquid crystal display (LCD), a mobile phone, shown in FIG. 1. The power management process 20 includes following steps:

Step 200: Start.

Step 210: Determine whether the mobile device 100 operates in a DC mode.

Step 220: Determine whether a loading of an operating system 102 of the mobile device 100 exceeds a predetermined value.

Step 230: Add a flag F1 associated with the embedded controller 106 in a physical memory 112 of the mobile device 100 when the mobile device 100 is operated in DC mode and the loading of the operating system 102 exceeds the predetermined value.

Step 240: Read the flag F1 in the physical memory 112 through the BIOS 104, to notify the embedded controller 106 to perform a power management process corresponding to the flag F1.

Step 250: End.

The mobile device 100 utilizes the power state, i.e. DC mode or AC mode, and the capacity information of mobile device 100 detected by the embedded controller 106 according to the power management process 20, and utilizes the operating system 102 to detect whether a loading exceeds a predetermined value. When the driver 110 of the operating system 102 determines the mobile device 100 operates in DC mode and the loading of the operating system 102 exceeds the predetermined value, the driver 110 adds a flag F1 associated with the embedded controller 106 into a physical memory 112 of the mobile device 100. And the BIOS 104 accordingly notifies the embedded controller 106 to perform the power management process corresponding to the flag F1 when the BIOS 104 has read the flag F1 in the physical memory 112.

Noticeably, the present invention defines memory addresses in the physical memory 112 for adding the flag F1, wherein the memory addresses are specifically used for the BIOS 104 and the driver 110 to read and write. In addition, the mentioned power management process includes at least one of the following steps: adjusting a brightness of a display of the mobile device 100, changing a background of the display, adjusting a processor performance of the mobile device 100, adjusting a memory performance of the mobile device 100, adjusting a graphic card performance of the mobile device 100, turning off a device connected to the mobile device 100 but not on duty, and changing a power scheme used by the mobile device 100. Furthermore, the present invention can define different flags for indicating the embedded controller 106 to perform different actions accordingly. Therefore, the BIOS 104 notifies the embedded controller 106 to perform the power management steps, e.g. adjusting the brightness of the display, according to the read flag.

The following illustration is based on the concept of the process 20. The mobile device 100 is assumed to be a laptop. When the laptop is on, the power consumption of the laptop may increase due to the loading of the operating system 102, usage of the computer system such as application programs consuming more system resource. Therefore, according to an embodiment of the present invention, when the driver 110 of the operating system 102 determines the laptop operates in DC mode and a loading of the operating system is high, the driver 110 adds the flag F1 in the physical memory 112. And then, the BIOS 104 notifies the embedded controller 106 to perform the steps of the mentioned power management process according to the flag F1 in the physical memory 112, so as to decrease power consumption of each hardware component, and thus longer the life time of the battery. For example, the flag F1 is a specific brightness adjustment flag responsible for adjusting the brightness of the display of the mobile device 100, therefore, when the BIOS reads the brightness adjustment flag in the physical memory 112, the BIOS notifies the embedded controller 106 to adjust the brightness of the display of the mobile device 100. Methods for acquiring the power information and the power capacity can be referred from above illustration.

Precisely speaking, after the driver 110 added the flag F1 in the physical memory 112, the laptop enters a power saving mode, and then through the embedded controller 106 to decrease the brightness of the display of the laptop, decrease a speedstep of the processor of the laptop, decrease a clock speed of the memory, decrease a clock speed of the graphic card, and/or turn off an universal serial bus (USB) device not on duty, to achieve power saving by directly decreasing power consumption of hardware components.

Figure 3:
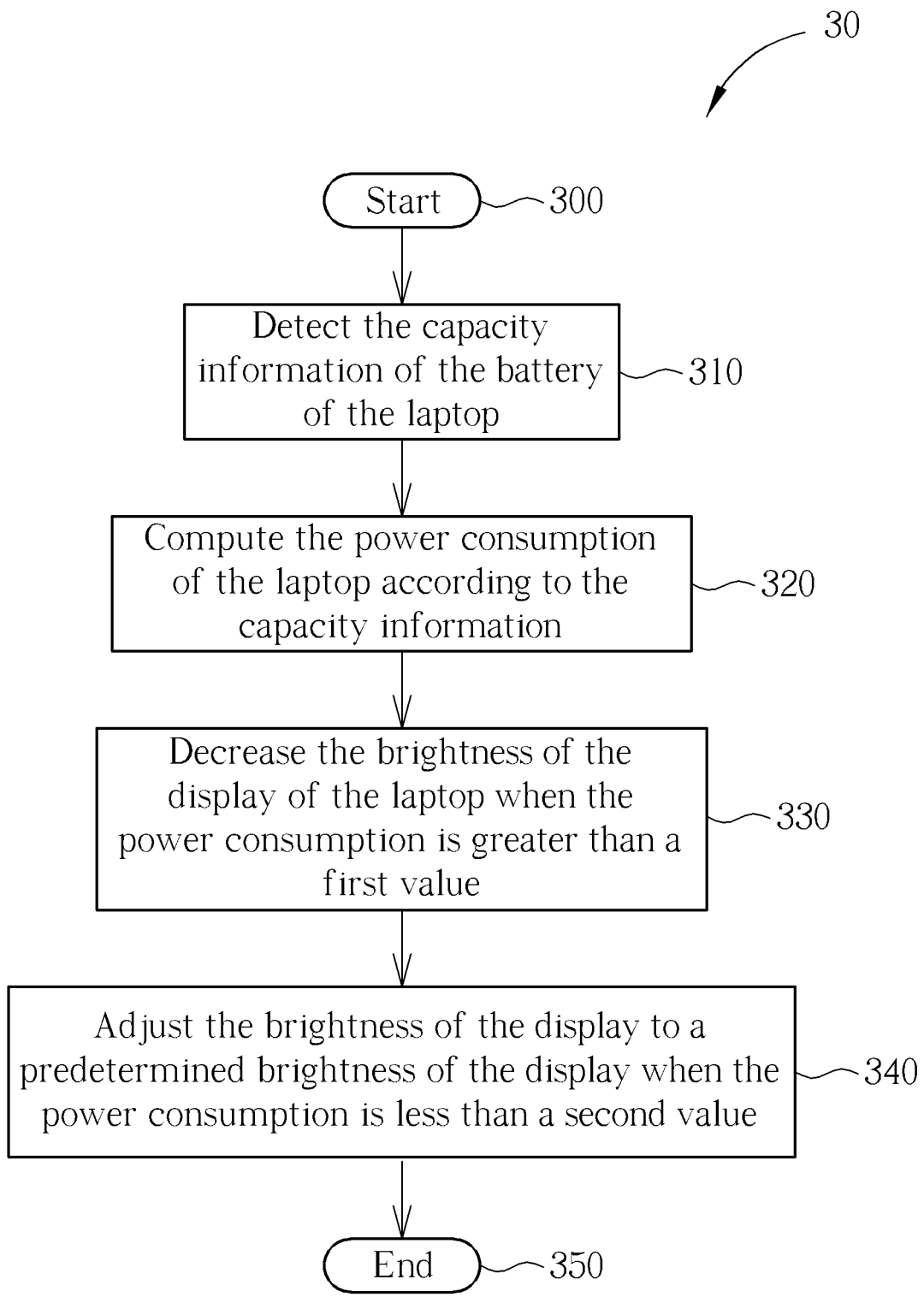
FIG. 3 is a brightness adjustment process according to an embodiment of the present invention.

Please further refer to FIG. 3, operations of the embedded controller 106 performing power management process to adjust the brightness of the display can be summarized as a brightness adjustment process 30. As shown in FIG. 3, the brightness adjustment process 30 includes following steps:

Step 300: Start.

Step 310: Detect the capacity information of the battery of the laptop.

Step 320: Compute the power consumption of the laptop according to the capacity information.

Step 330: Decrease the brightness of the display of the laptop when the power consumption is greater than a first value.

Step 340: Adjust the brightness of the display to a predetermined brightness of the display when the power consumption is less than a second value.

Step 350: End.

After the laptop entered power saving mode, the embedded controller 106 detects the capacity information of the battery, e.g. mentioned capacity information of the battery, according to the brightness adjustment process 30, and computes the power consumption of the battery according to the capacity information. If the power consumption is greater than the first power value set by the laptop, the embedded controller 106 decreases the current brightness of the display. On the other hand, after the embedded controller 106 has decreased the brightness of the display, if the laptop is still in power saving mode, the embedded controller 106 continuously detects the capacity information of the battery and computes the power consumption of the battery. At this moment, if the power consumption is less than the second power value set by the laptop, the embedded controller 106 returns the brightness of the display to the predetermined brightness.

For example, assumed that the predetermined brightness of the display is x, the first power value is 10 Watts and second power value is 7 Watts. When the embedded controller 106 has computed the current power consumption is greater than 10 Watts, the embedded controller 106 decreases the brightness of the display to x−1. After the brightness of the display is decreased, if the laptop is still in power saving mode, the embedded controller 106 detects new capacity information again and computes the power consumption. When the new power consumption is less than 7 Watts, the embedded controller 106 adjusts the brightness of the display from x−1 to the predetermined brightness value x, so as to avoid decreasing the brightness of the display excessively. Since the display consumes most of the power, the embodiment of the present invention decreases the power consumption of the laptop by decreasing the brightness of the display, and thus the brightness adjustment process 30 is effective for power saving.

In another embodiment, when the operating system 102 detects an application program responsible for monitoring power consumption, such as MobileMark for evaluating the battery runtime of the laptop, in the operating system 102 and the mobile device 100 operates in DC mode, the driver 110 adds the flag F1 in the physical memory 112, which allows the laptop to enter power saving mode. Detailed description can be referred from above, so it is not given herein.

In addition, the present invention deletes the flag F1 in the physical memory 112 when the mobile device 100 turns from DC mode to an AC mode, after the embedded controller 106 has completed the power management process, when the battery can not provide sufficient power to the mobile device 100 or when the MobileMark is removed, so that the mobile device 100 returns from power saving mode to normal mode.

Noticeably, the power management process 20 according to the embodiment of the present invention is realized by software manner, which utilizes the driver 110 of the operating system 102 to trigger the power saving mechanism of the mobile device 100 for some specific situation, e.g. the mobile device 100 is in DC mode and the loading of the operating system 102 is too high. In addition, the present invention can directly decrease the power consumption of each hardware component through adjusting the processor speedstep, changing the desktop background and display brightness, etc. In comparison, the prior art utilizes the ACPI to control the power supply of each hardware component to decrease the power supply, so as to longer the battery life time. As a result, the ACPI can not decrease the power consumption of hardware directly, and lacks of flexibility of power management, and thus the power saving performance is restricted.

To sum up, the power management method of the present invention provides mechanism for decreasing power consumption of hardware to improve performance and flexibility of power management.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A power management method for a mobile device comprising a basic input output system (BIOS) and an embedded controller (EC), the power management method comprising:
   determining whether the mobile device operates in a direct current (DC) mode;
   determining whether a loading of an operating system of the mobile device exceeds a predetermined value corresponding to power consumption status;
   adding a flag associated with the embedded controller in a physical memory of the mobile device when the mobile device is operated in the DC mode and the loading of the operating system exceeds the predetermined value; and
   reading the flag in the physical memory via the basic input output system, to notify the embedded controller to perform a power management process corresponding to the flag.

2. The power management method of claim 1, wherein the power management process comprises at least one of steps of adjusting a brightness of a display of the mobile device, changing a background of the display, adjusting a processor performance of the mobile device, adjusting a memory performance of the mobile device, adjusting a graphic card performance of the mobile device, turning off a device connected to the mobile device but not on duty, and changing a power scheme used by the mobile device.

3. The power management method of claim 2, wherein the flag is a specific brightness adjustment flag, and the brightness adjustment flag is responsible for adjusting the brightness of the display of the mobile device; the step of reading the flag in the physical memory via the basic input output system, to notify the embedded controller to perform a power management process corresponding to the flag comprises:
   reading the flag in the physical memory via the basic input output system, to notify the embedded controller to adjust the brightness of the display of the mobile device.

4. The power management method of claim 2 further comprising:
   detecting capacity information of a battery of the mobile device; and
   computing a power consumption of the mobile device according to the capacity information;

wherein the step of adjusting the brightness of the display of the mobile device comprises:
decreasing the brightness of the display when the power consumption is greater than a first value; and
adjusting the brightness of the display to a predetermined brightness of the display when the power consumption is less than a second value.

5. The power management method of claim 4 further comprising:
deleting the flag in the physical memory when the mobile device turns from the DC mode to an AC mode;
deleting the flag of the physical memory when the embedded controller has completed the power management process; or
deleting the flag of the physical memory when the battery can not provide sufficient power to the mobile device.

6. The power management method of claim 2, wherein the step of adjusting the processor performance of the mobile device comprises decreasing a speedstep of the processor.

7. The power management method of claim 2, wherein the step of adjusting the memory performance of the mobile device comprises decreasing a clock speed of the memory.

8. The power management method of claim 2, wherein the step of adjusting the graphic card performance comprises decreasing a clock speed of the graphic card.

9. The power management method of claim 2, wherein the step of turning off the device connected to the mobile device but not on duty comprises turning off the device connected to the mobile device via a universal serial bus (USB) interface but not on duty.

10. The power management method of claim 1 further comprising:
determining whether an application program for monitoring the power consumption of the mobile device is loaded into the operating system; and
adding the flag into the physical memory when the mobile device operates in the DC mode and the application process is loaded into the operating system.

11. The power management method of claim 10 further comprising:
deleting the flag in the physical memory if the application program is removed.

12. A mobile device with a function of power management, comprising:
an embedded controller for detecting whether the mobile device operates in a DC mode;
an operating system for detecting whether a loading of the operating system exceeds a predetermined value and comprises a driver for adding a flag associated with the embedded controller in a physical memory of the mobile device when the mobile device operates in the DC mode and the loading of the operating system exceeds the predetermined value corresponding to power consumption status; and
a basic input output system (BIOS) for reading the flag in the physical memory via the basic input output system, to notify the embedded controller to perform a power management process corresponding to the flag.

13. The mobile device of claim 12, wherein the embedded controller is further used for performing at least one of the following steps:
adjusting a brightness of a display of the mobile device;
changing a desktop background of the display;
adjusting a processor performance of the mobile device;
adjusting a memory performance of the mobile device;
adjusting a graphic card performance of the mobile device;
turning off a device connected to the mobile device but not on duty; and
changing a power scheme used by the mobile device.

14. The mobile device of claim 13, wherein the flag is a brightness adjustment flag, and the brightness adjustment flag is responsible for adjusting the brightness of the display of the mobile device; the BIOS is further used for reading the brightness adjust flag in the physical memory, to notify the embedded controller adjusts the brightness of the display of the mobile device.

15. The mobile device of claim 13, wherein the embedded controller is further used for acquiring a battery capacity of the mobile device, and computing the power consumption of the mobile device according to the battery capacity, decreasing the brightness of the display if the power consumption is greater than a first value, and adjusting the brightness of the display to a predetermined brightness of the display if the power consumption is less than a second value.

16. The mobile device of claim 15, wherein the BIOS is further used for deleting the flag in the physical memory when the mobile device turns from the DC mode to an AC mode, deleting the flag in the physical memory when the embedded controller has completed the power management process, or deleting the flag in the physical memory when the battery can not provide sufficient power to the mobile device.

17. The mobile device of claim 13, wherein the embedded controller is further used for decreasing the speedstep of the processor, decreasing the clock speed of the memory, decreasing the clock speed of the graphic card, and turning off the device connected to the mobile device via a USB interface but not on duty.

18. The mobile device of claim 12, wherein the operating system is further used for detecting whether a application program for monitoring power consumption of the mobile device is loaded into the operating system, and the driver is further used for adding the flag into the physical memory when the mobile device operates in the DC mode and the application process is loaded into the operating system.

19. The mobile device of claim 18, wherein the BIOS is further used for deleting the flag in the physical memory when the application program is removed.

* * * * *